UNITED STATES PATENT OFFICE.

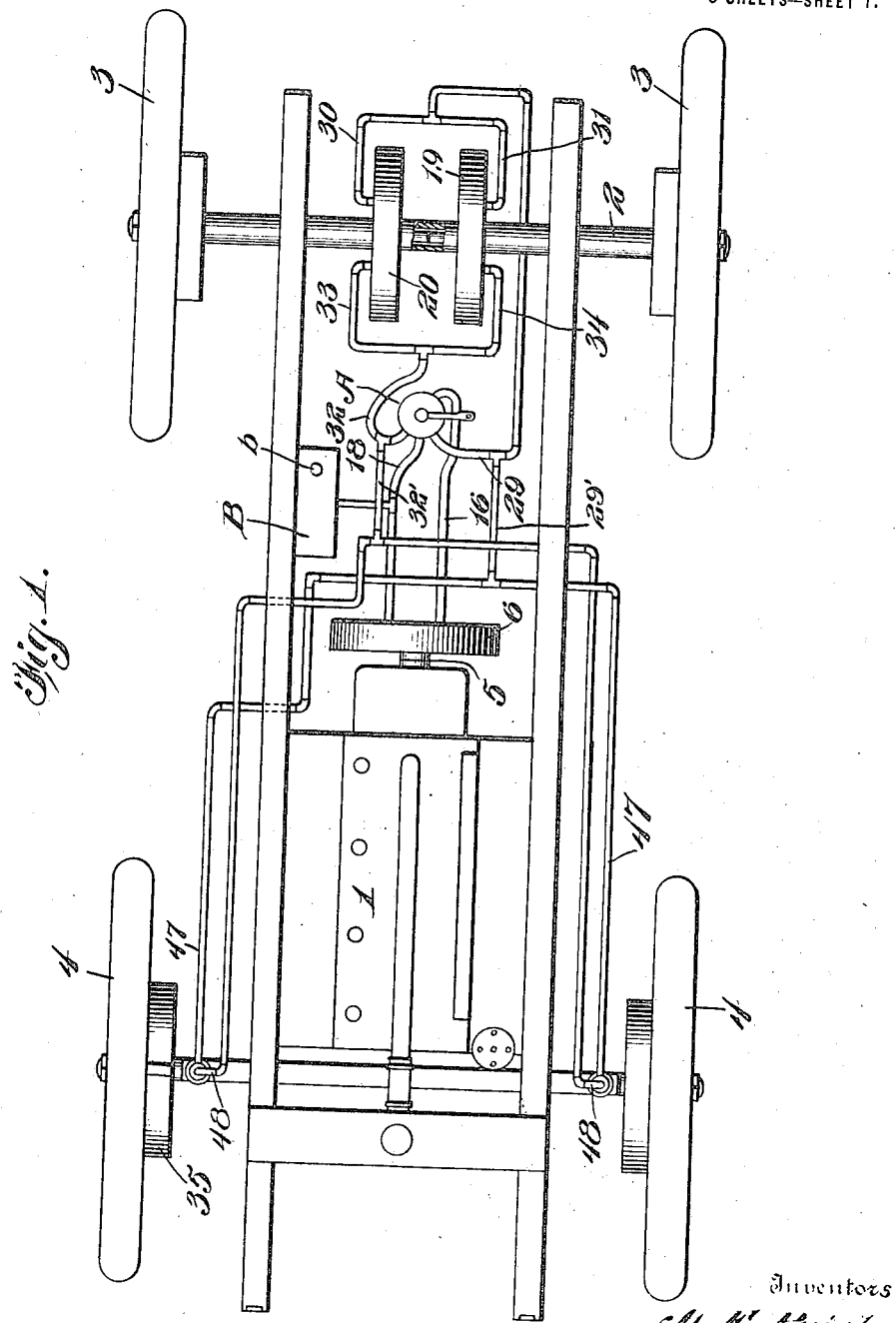

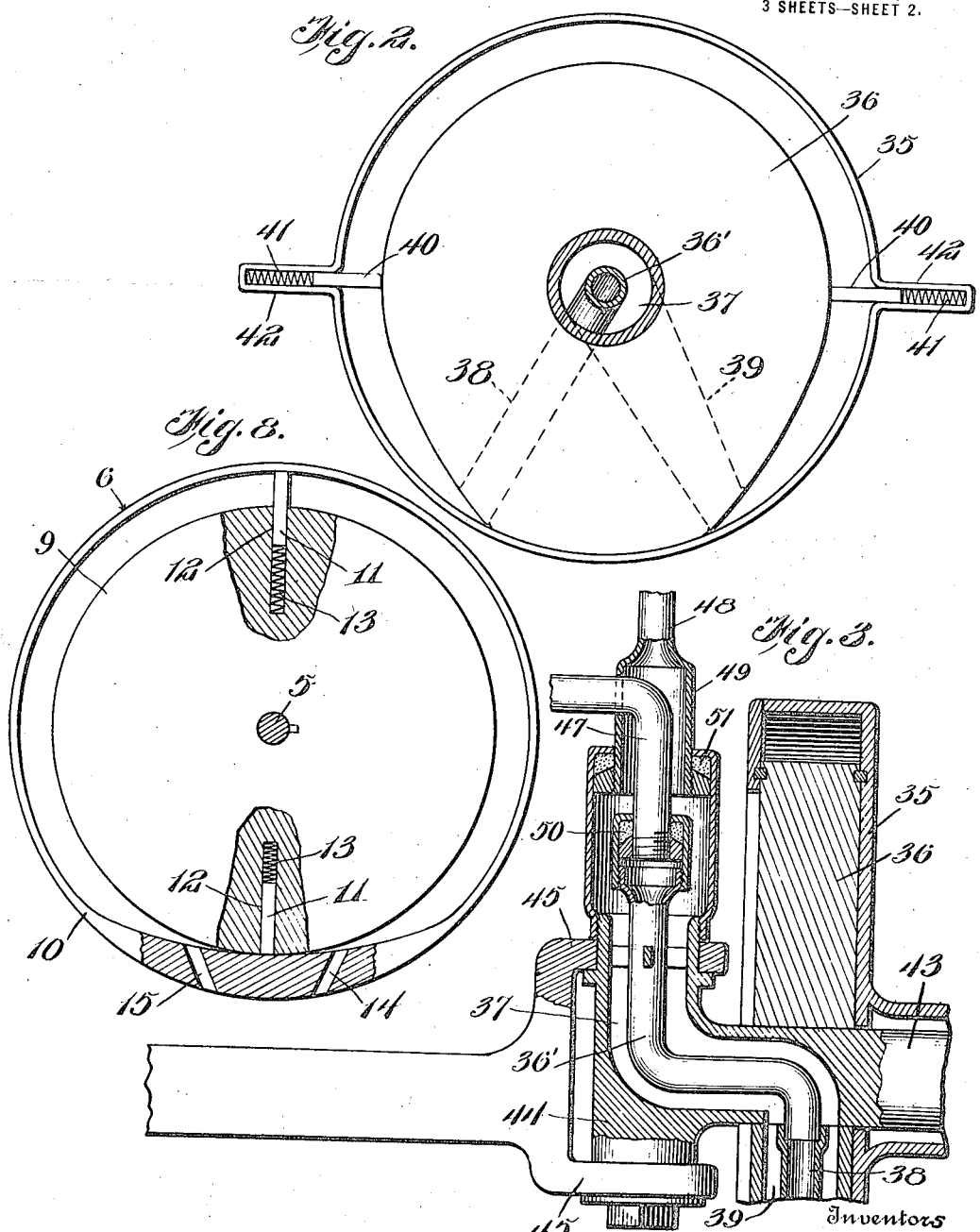

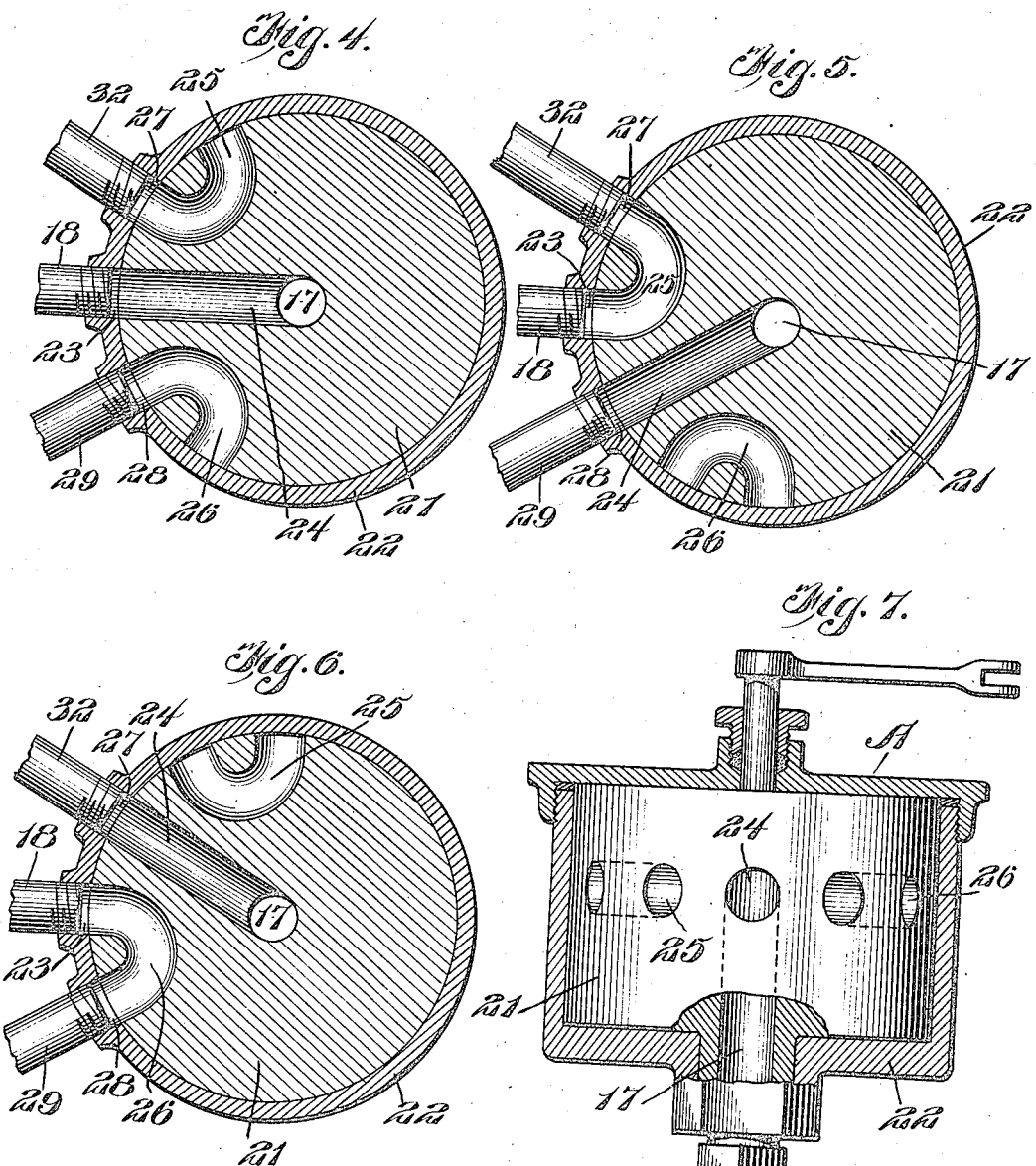

ALBERT E. PAINTER AND WATERFIELD PAINTER, OF RENO, NEVADA.

FLUID-PRESSURE TRANSMISSION.

1,242,033.  Specification of Letters Patent.  Patented Oct. 2, 1917.

Application filed June 30, 1916.  Serial No. 106,894.

*To all whom it may concern:*

Be it known that we, ALBERT E. PAINTER and WATERFIELD PAINTER, citizens of the United States, residing at Reno, in the county of Washoe and State of Nevada, have invented new and useful Improvements in Fluid-Pressure Transmission, of which the following is a specification.

This invention relates to fluid pressure transmission, and while especially designed for use in connection with the driving wheels of an automobile or similar vehicle, it will be apparent as the description proceeds that the transmission apparatus may be used in various other connections which will readily suggest themselves.

One of the main objects of the present invention is to produce fluid pressure transmission apparatus by means of which the power of an engine may be transmitted to a point remote therefrom so as to drive an axle or shaft in either direction; to drive said axle or shaft at different speeds according to the desire or requirements of the operator; also to compensate for or admit of the differential movement of the driven axle or shaft sections and, in automobile practice, differential movement of the driving wheels of the machine, enabling the power to be transmitted to the driving wheels whether the machine is moving in a straight direction or making a turn or curve in either direction.

With the above and other objects in view, the invention consists in the novel construction, combination and arrangement of parts, as herein described, illustrated and claimed.

In the accompanying drawings:—

Figure 1 is a plan view illustrating the transmission apparatus as applied to the chassis and wheels of an automobile.

Fig. 2 is a vertical sectional view of one of the fluid motors.

Fig. 3 is a fragmentary sectional view through one of the fluid motors associated with one of the wheels, and illustrating the parts immediately associated therewith.

Figs. 4, 5 and 6 are sectional views of the controlling valve, showing the three positions thereof.

Fig. 7 is a sectional view of said valve taken at right angles to Figs. 4, 5 and 6.

Fig. 8 is a sectional view of the combined pump and motor.

Referring primarily to Fig. 1, 1 designates the engine of an automobile, 2 the rear axle, 3 the rear driving wheels, 4 the front driving wheels and 5 the engine shaft, said parts being arranged in the usual relation to each other.

In carrying out the invention, a rotary pump 6 is mounted fast on the engine shaft 5, or an extension thereof, and is driven thereby. The pump 6 which is illustrated in section in Fig. 8, comprises a disk-shaped or cylindrical rotor 9 which is fast on the engine shaft 5, a stationary cylindrical casing 10 which may be fastened by any suitable means to the frame of the machine, and a plurality of radially slidable blades 11 which are mounted in guide ways 12 in the rotor 9 and pressed outwardly by means of springs 13 located behind said blades in the guide ways 12. The casing 10 is provided with an inlet port 14 and an outlet port 15, the fluid or liquid being drawn inwardly through the port 14 during the rotation of the rotor 9 and being forced outwardly thereby through the port 15.

Connected to the outlet port 15 of the pump 6 is a supply pipe 16 which leads to the inlet port 17 of a controlling valve hereinafter particularly described. A return pipe 18 leads from said valve back to the inlet opening 14 of the pump 6. Mounted on one of the sections of the driving axle 2 is a fluid motor 19; a similar motor 20 is mounted on the other section of the driving axle 2. Each of the motors 19 and 20 may be constructed in the same manner as the pump 6 hereinabove described and illustrated in Fig. 8, or it may be constructed in the manner illustrated in Fig. 2 as may be preferred. The motors 19 and 20 are, of course, independent of each other to a certain extent so as to allow for any differential movement in speed of the driving wheels 3 similar to the differential gearing now in common use in automobile practice. The controlling valve designated generally at A comprising a cylindrical valve body 21 and a valve casing 22 surrounding and inclosing the same. The casing 22 is formed in the periphery thereof with a return port 23 which is adapted to register with a passage 24 communicating directly with the inlet 17. The valve is further provided with a U-shaped passage 25 and another U-shaped passage 26 while the casing A is formed with a port 27 adapted to register with the passage 25 and the casing is also provided with another port 28 adapted to register with the passage 26. A motor supply pipe 29 leads from the port 28 and is bifurcated or forked to provide two branches 30 and 31 which lead to the inlet openings of the motors 19 and 20. A return pipe 32 communicates at one end with the port 27 of the valve casing and is also bifurcated or forked to provide branches 33 and 34 which communicate with the outlet openings of the motors 19 and 20. When the valve 21 is in the position illustrated in Fig. 4, the pipes 29 and 32 are cut off and the fluid or liquid returns directly through the pipe 18 to the pump 6 without reaching the motors 19 and 20. When the valve is turned to the position illustrated in Fig. 5, the fluid or liquid entering the inlet 17 of the pump is carried through the supply pipe 29 to the motors 19 and 20 and is returned through the pipe 32 to the valve and thence through the return pipe 18 back to the pump 6. When the valve 21 is turned to the position illustrated in Fig. 6, the fluid or liquid from the pump entering the inlet 17 of the valve passes through the pipe 32 and through the motors 19 and 20 and returns through the pipe 29 to the valve and thence through the pipe 18 back to the pump 6. In the second arrangement referred to and shown in Fig. 5, the machine is driven in a forward direction, while under the arrangement shown in Fig. 6 the vehicle is driven in the reverse direction. Under either direction of driving, the motors are capable of the necessary independent movement to provide for the difference in the speed of the driving wheels 3, as in making turns or curves.

The motor illustrated in Fig. 2 comprises a rotary cylindrical casing 35 fastened to and rotating with the adjacent vehicle wheel and a stationary member 36 therein formed with a central conduit 36' and a surrounding concentric conduit 37 thus providing for the inlet and outlet of the fluid or oil by means of which the motor is operated. A substantially radial passage 38 in the member 36 communicates with the central conduit 36' while another substantially radial passage 39 communicates with the larger conduit 37. Radially movable blades 40 are carried by the rotary casing 35 and are compressed inwardly against the periphery of the stationary member 36 by means of springs 41 located in guiding and housing extensions 42 of the casing 35. The motor just hereinabove described and illustrated in Fig. 2 is particularly adapted for use in connection with the front wheels 4 of a motor vehicle. Referring to Fig. 3, the motor just described is shown therein at 35 and is arranged centrally of the wheel 4. The stationary member 36 is fast on the spindle 43 of the adjacent steering knuckle 44 mounted to turn on a vertical axis in the fork arms 45 of the front axle 46. 36' indicates the central conduit corresponding with the central conduit 36' of Fig. 2, and 37 represents the surrounding concentric conduit the same as that referred to in Fig. 2. One of said conduits is utilized for carrying the fluid or liquid to the motor while the other conduit is utilized for conducting the fluid or liquid away from said motor, the fluid or liquid moving in a direction corresponding with the direction in which the motor 35 is to be turned as in driving forwardly or rearwardly.

The knuckle 44 is extended above the upper fork 45 of the knuckle 44 and has attached thereto a central pipe 47 and another pipe 48 which is shown as enlarged at 49 so as to surround and inclose a portion of the pipe 47. The pipes 47 and 48 are in communication with the pump 6 in the same manner as the motors 19 and 20 hereinabove described and therefore, by the means referred to, all four wheels of the machine may be driven by the fluid pressure transmission apparatus. Furthermore, by varying the position of the valve 21, more or less fluid or liquid may be admitted to the motors for the purpose of regulating the speed at which the vehicle is driven. The pipes 47 and 48 are shown as connected by stuffing boxes 50 and 51 to the head of the respective steering knuckles so as to communicate with the conduits 36' and 37 above described.

While it is preferred at the present time to use oil in the apparatus hereinabove described, it will, of course, be understood that water or air or any other liquid or fluid may be used, which ever is found best adapted for the purpose. The controlling valve may, of course, be located at any desired point, either adjacent to the pump or to the motors or close to the seat of the operator. By constructing the motors as illustrated in Fig. 2, greater road clearance is obtained, which is an advantage in some makes of machines, especially those of the low down build or under slung type and having small driving and steering wheels. The apparatus is, of course, applicable to automobiles, motor trucks and power driven vehicles of all kinds. It is also apparent that various changes may be made in the form, proportion and minor details of construction without departing from the principles or sacrificing any of the advantages of the invention.

We claim:—

1. The combination with the driving wheel of a vehicle, of a fluid pressure motor comprising a stationary member having centrally arranged and concentric conduits for the fluid, an outer casing eccentric to said stationary member and having a fixed relation to the body of the wheel, slidable blades carried by said casing of the motor and riding in contact with the periphery of the stationary member, the latter being formed with substantially radial inlet and outlet passages communicating with said concentric conduits.

2. The combination with the driving wheel of a vehicle, of a fluid pressure motor comprising a stationary member having centrally arranged and concentric conduits for the fluid, an outer casing eccentric to said stationary member and having a fixed relation to the body of the wheel, slidable blades carried by said casing of the motor and riding in contact with the periphery of the stationary member, the latter being formed with substantially radial inlet and outlet passages communicating with said concentric conduits, and a steering knuckle by which said wheel is carried having fluid inlet and outlet passages in communication with the first named inlet and outlet passages.

In testimony whereof we affix our signatures in presence of two witnesses.

ALBERT E. PAINTER.
WATERFIELD PAINTER.

Witnesses:
R. W. POOLE,
J. B. DIXON.